United States Patent [19]

Fukuda

[11] Patent Number: 5,372,215
[45] Date of Patent: Dec. 13, 1994

[54] SPLIT ENGINE FOR A SNOWMOBILE HAVING AN ANGULAR MOTION ACCOMMODATING CONNECTION BETWEEN THE TWO ENGINE OUTPUT SHAFTS

[75] Inventor: Kazutaka Fukuda, Iwata, Japan

[73] Assignee: Yamaha Hatsudoki Kabushiki Kaisha, Iwata, Japan

[21] Appl. No.: 43,657

[22] Filed: Apr. 6, 1993

Related U.S. Application Data

[63] Continuation-in-part of Ser. No. 820,326, Jan. 13, 1992, Pat. No. 5,279,381.

[30] Foreign Application Priority Data

Jan. 16, 1991 [JP] Japan .................. 3-17071

[51] Int. Cl.$^5$ ........................................ B62M 27/02
[52] U.S. Cl. ........................................ 180/190; 180/297; 123/197.1; 74/411; 74/597; 74/598
[58] Field of Search .................. 180/190, 297; 74/597, 74/598, 411, 421 A, 15.63; 123/197.1

[56] References Cited

U.S. PATENT DOCUMENTS

| 752,905 | 2/1904 | Kay | 123/197.1 |
|---|---|---|---|
| 1,128,885 | 2/1915 | Livingston | 123/197.1 |
| 1,495,786 | 5/1924 | Finley et al. | 123/197.1 |
| 1,563,405 | 12/1925 | Schlumberger | 123/197.1 |
| 1,999,267 | 4/1935 | Willgoos | 74/598 |
| 2,364,109 | 5/1944 | Taylor | 74/598 |
| 2,797,672 | 7/1957 | Waterhouse et al. | 123/197.1 X |
| 3,686,971 | 8/1972 | Strehler et al. | 74/597 |
| 4,475,495 | 10/1984 | Lydell | 123/197.1 |
| 4,674,351 | 6/1987 | Byrd | 74/411 X |
| 4,700,582 | 10/1987 | Bessette | 74/411 X |
| 4,714,060 | 12/1987 | Kesteloot | 74/598 |
| 4,848,503 | 7/1989 | Yasui et al. | 180/190 |
| 4,938,098 | 7/1990 | Sasaki et al. | 180/297 |
| 5,024,287 | 6/1991 | Okui et al. | 180/297 |
| 5,172,786 | 12/1992 | Ishibashi et al. | 180/190 |

FOREIGN PATENT DOCUMENTS

| 0338219 | 11/1903 | France | 123/197.1 |
|---|---|---|---|
| 0395806 | 2/1923 | Germany | 123/197.1 |
| 0159759 | 11/1940 | Germany | 123/197.1 |
| 0192779 | 11/1957 | Germany | 123/197.1 |
| 0129730 | 7/1919 | United Kingdom | 74/597 |
| 0206971 | 11/1923 | United Kingdom | 123/197.1 |

Primary Examiner—Margaret A. Focarino
Assistant Examiner—Peter English
Attorney, Agent, or Firm—Knobbe, Martens, Olson & Bear

[57] ABSTRACT

A driving arrangement for driving a snowmobile having an improved power transmission system that is comprised of a split engine having two cylinder blocks each containing at least a pair of cylinders with their output shafts connected to each other. A belt drive shaft is journaled by the engine assembly and is driven off the output shafts at the point where they are joined together. The belt drive shaft drives the drive belt of the snowmobile through a variable pulley transmission. Several embodiments of driving connections between the output shafts and the belt drive shaft that accommodate angular motion while transmitting large driving forces are disclosed. These include both splined connections and/or connections including flexible couplings.

11 Claims, 8 Drawing Sheets

SPLIT ENGINE FOR A SNOWMOBILE HAVING AN ANGULAR MOTION ACCOMMODATING CONNECTION BETWEEN THE TWO ENGINE OUTPUT SHAFTS

CROSS REFERENCE TO RELATED APPLICATION

This application is a continuation-in-part of our copending application entitled "Power Transmission System For Snowmobile", Ser. No. 820,326, filed Jan. 13, 1992 now U.S. Pat. No. 5,279,381 and assigned to the Assignee hereof.

BACKGROUND OF THE INVENTION

This invention relates to a power transmission system and more particularly to an arrangement for driving a shaft from the aligned output shafts of an internal combustion engine.

In many instances, it is desirable to drive a shaft from an engine output shaft at a point other than at the end of the engine output shaft. It is particularly desirable if the engine is provided with separate output shafts so as to decrease the overall length of the individual output shafts and to drive the driven shaft from the adjacent ends of the engine output shafts. Such an arrangement has a number of advantages but it also presents certain problems.

For example, when the engine is split and has two separate engine output shafts, even though the output shafts are maintained in a coaxial relationship, vibrations and flexures can cause the output shafts to assume a somewhat angular relationship to each other. With conventional driving arrangements, this can present significant problems.

It is, therefore, a principal object of this invention to provide an improved arrangement for driving a shaft from adjacent ends of a pair of engine output shafts and wherein the drive accommodates some angular movement between the engine output shafts.

Although it is desirable to accommodate angular movement between the engine output shafts for the purposes aforenoted, the joint which accommodates the angular movement must also be strong enough to permit full power transmission. It is, therefore, a still further object of this invention to provide an improved joint arrangement for driving a shaft from the adjacent ends of a pair of engine output shafts wherein the joint accommodates angular movement between the engine output shafts but still is capable of transmitting large amounts of power.

There are many instances when it is desirable to provide a drive from an engine wherein the shaft driven is driven off of a split engine output shaft. For example, it is conventional in snowmobile construction to mount the driving internal combustion engine so that its output shaft rotates about an axis that extends transversely to the longitudinal center line of the snowmobile. The engine output shaft is then coupled through a variable transmission, which may include a centrifugal clutch, to the drive belt. Due to the substantial width of the drive belts of the snowmobile, it has heretofore, been the practice to drive the variable transmission off one end of the engine output shaft. However, this has several disadvantages.

In the first instance, if the engine output shaft also drives the variable transmission, side loadings on the engine output shaft will be generated due to the inherent operation of the variable transmission. This can place undue wear on the engine output shaft.

In addition, when the variable transmission and a centrifugal clutch is placed on the end of the engine output shaft, then the overall drive package becomes quite large. This is a particular problem when a multiple cylinder engine is employed since the engine itself may be quite long. In addition, driving the transmission off one end of the engine output shaft, even if the transmission is driven through an intermediate shaft, can put substantial torsional loading on the output shaft of the engine.

It is, therefore, a further object of this invention to provide an improved power transmission system for a snowmobile.

It is a further object of this invention to provide a power transmission system for a snowmobile wherein the engine and transmission package may be kept quite compact even when multiple cylinder engines are employed.

It is a further object of the invention to provide an improved arrangement for driving an intermediate shaft which drives a variable transmission for a snowmobile drive from an engine without placing large torsional stresses on the engine output shaft.

SUMMARY OF THE INVENTION

The features of the invention are adapted to be embodied in a driving arrangement for driving a shaft from a pair of engine output shafts which output shafts are rotatable about concentric axes. A first element is fixed for rotation with one adjacent end of one of the engine output shafts and a second element is affixed for rotation with the adjacent end of the other end of the engine output shafts.

In accordance with a first feature of the invention, means including a splined connection is provided for driving the shaft from the elements. The splined connection includes internal and external splined cylindrical elements having a substantially greater diameter than the width in the axial direction for permitting axial flexure while maintaining circumferential rigidity.

In accordance with another feature of the invention, means including a resilient connection is provided for driving the shaft from the elements.

Drives of the type described in the two preceding paragraphs are particularly advantageous in driving the belt drive shaft of a snowmobile from an engine having output shafts that are transversely disposed relative to the longitudinal axis of the snowmobile.

DETAILED DESCRIPTION OF THE PREFERRED EMBODIMENTS OF THE INVENTION

Figure 1:
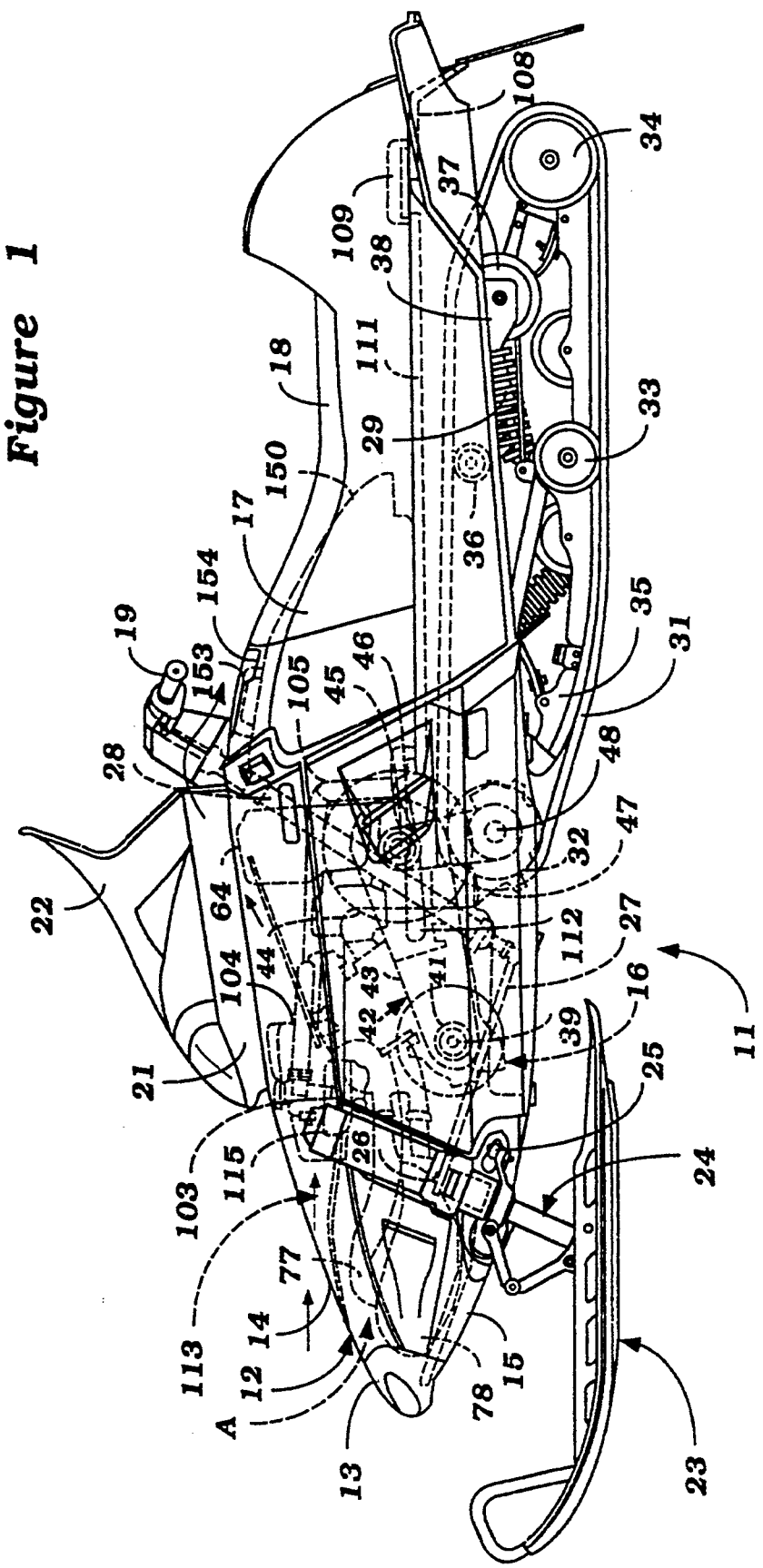
FIG. 1 is a side elevational view of a snowmobile constructed in accordance with an embodiment of the invention.
Figure 2:
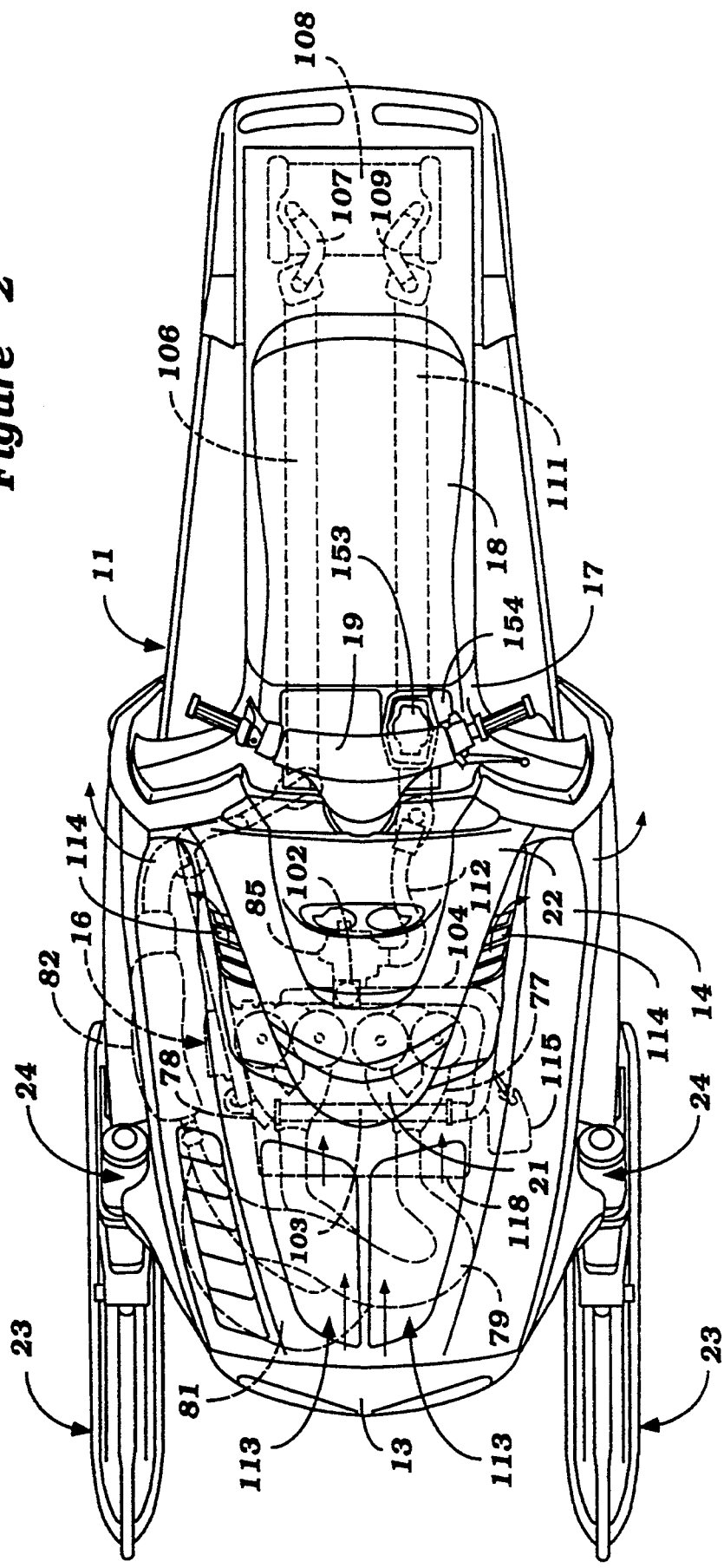
FIG. 2 is a top plan view of the snowmobile.

Referring first to FIGS. 1 and 2, a snowmobile constructed in accordance with an embodiment of the invention is identified generally by the reference numeral 11. The snowmobile 11 includes a body assembly 12 made up of a number of parts which may be formed from suitable materials and which includes a nose piece 13 an upper engine cowling 14 and a lower tray 15 which together define an engine compartment in which a powering internal combustion engine, indicated generally by the reference numeral 16 is positioned.

In the illustrated embodiment, the engine 16 is of the inline four cylinder type operating on a two cycle crankcase compression principal. Although the engine 16 is described as being a four cylinder inline engine, it will be apparent as the description proceeds that the engine 16 is, in fact, comprised of two, two cylinder inline engines joined end to end. Although the invention has particular utility in conjunction with such engines, it is to be understood that certain facets of the invention may be employed with engines of other types. However, the invention does have particular utility in conjunction with two cycle crankcase compression engines, for a reason which will become apparent.

The body 12 further includes a rear body portion 17 that accommodates a seat 18 adapted to seat one or more riders seated in straddle fashion. A handlebar assembly 19 is positioned forwardly of the seat 18 for steering of the snowmobile, in a manner which will be described.

There is provided further an upper cowling portion 21 which may be removable to access the engine compartment and which carries an upper windshield 22 that is disposed forwardly of the handlebar assembly 19 for affording protection to the riders seated on the seat 18.

A pair of front skis 23 are supported at the forward portion of the body 12 by means of suspension struts 24 which also accommodate steering movement of the skis 23. The struts 24 are interconnected by means of a tie rod 25 so that they may be steered in unison and one of the skis 23 is provided with a steering link 26 which is connected to a steering rod 27 which is, in turn, operated by a steering column 28 that is coupled to the aforementioned handlebar assembly 19.

Rearwardly of the front skis 23, and beneath the seat 18, the body 12 suspends a carriage assembly, indicated generally by the reference numeral 29 by a suitable suspension system and which carriage assembly 29 supports a drive belt, indicated at 31. The drive belt 31 is trained around a driving sprocket 32, which is driven in a manner to be described, and idler sprockets 33 and 34 that are mounted on a pair of rails 35 of the carriage 29. In addition, further idler rolls 36 and 37 are carried by the carriage 29 and engage the drive belt 31 so as to confine and direct its path of movement. The rear idler wheels 37 are carried by frame members 38 of the carriage assembly 29 in a suitable manner.

The engine 16 is disposed transversely in the engine compartment and its output shaft (to be described by reference to the remaining figures) drives a belt drive shaft 39 in a manner which will also be described and which belt drive shaft 39 extends transversely to the longitudinal center line of the snowmobile 12 as does the crankshaft or output shaft of the engine 16. This belt drive shaft 39 drives a variable pulley 41 of a variable speed pulley drive mechanism indicated generally by the reference numeral 42 and which also has a construction which will be described later by reference to FIG. 3. This drive pulley 41 drives a belt 43 which, in turn, drives a driven variable pulley 44 which is affixed to an intermediate shaft 45. The intermediate shaft 45 has affixed to it a sprocket 46 which drives a drive belt 47 which is, in turn, trained around a sprocket that is affixed to a shaft 48 which is also coupled to the belt drive sprocket 32.

The construction of the engine 16 will now be described by particular reference to the remaining figures and initially to FIGS. 4 and 5. As has been noted, the engine 16 is of the four cylinder inline type but actually is made up of two, two inline cylinder engines connected end to end. To this end, each of these two cylinder engines comprises a respective cylinder block 49 and 51. The cylinder blocks 49 and 51 are, however, connected to a common crankcase assembly, made up of an upper member 52 and a lower member 53 which are affixed to each other and to the cylinder blocks 49 and 51 in any suitable manner.

The cylinder blocks 49 and 51 each have pairs of cylinder bores 54 in which pistons 55 are supported for reciprocation. The pistons 55 are, in turn, connected to connecting rods 56 that are journaled on respective throws of a pair of crankshafts 57 and 58, each associated with the cylinder block 49 and 51 respectively. The crankshafts 57 and 58 are of the built up type so as to permit the use of needle bearings on the big ends of the connecting rods 56 and any type of built up construction may be employed.

It should be noted that the pistons of the cylinder blocks 49 and 51 are disposed so that they fire at 180 degree crankshaft impulses from each other. The reason for this will become apparent.

The crankshaft 57 has affixed to it an internally splined gear 59 while the crankshaft 58 has affixed to it an externally splined gear 61 that is received in the internal splines of the gear 59 so as to couple the crankshafts 57 and 58 for rotation with each other. The crankshafts are coupled in such a way that the cylinders of the cylinder block 51 will fire at a different angle from the cylinders of the cylinder block 49 and preferably the angular difference in firing is 90 degrees. Again, the reasons for this will become apparent.

The splined connection 59–61 between the crankshafts 57 and 58 is such that it will accommodate some angular misalignment between the crankshafts 57 and 58 and which will, nevertheless, provide a strong connection that can accommodate the circumferential or radial driving forces to couple the crankshafts 57 and 58 for simultaneous rotation. To achieve this result, the length "H" of the splined connection between the splines 59–61 is substantially less than the diameter "D" of the splined connection. That is, the cylindrical diameter of the splined connection is substantially greater than its axial length. As a result, it will be possible to transmit high rotational forces while, at the same time, accommodating angular misalignment. This angular misalignment may occur due to flexure of the engine.

As is typical of two cycle crankcase compression engines, the crankcase chamber of the engine 16 is divided into individual chambers 62 each of which are sealed from each other and each of which is associated with a respective one of the cylinder bores 54. An intake charge is delivered to the crankcase chamber 62 from an induction system of the type disclosed in co-pending application entitled "Induction System For Snowmobile", Ser. No. 07/820,325, filed on the same day as the parent of this application and assigned to the Assignee hereof (Attorney Docket Number 2503-F02026), the disclosure of which is incorporated herein by reference. This induction system is shown partially in FIG. 1 and is identified generally by the reference numeral 63. The induction system 63 includes a pair of air boxes 64 to which atmospheric air is admitted as described in co-pending application Ser. No. 07/820,325, and which is filtered and then delivered to a pair of carburetors 65. The carburetors 65 communicate with a manifold 66 that then supplies air to a respective inlet port 67 formed in the respective cylinder block 49 and 51 and in which a reed type check valve 68 is provided so as to permit flow into the individual crankcase chambers 62 but not in the opposite direction when the charge is compressed by the downward movement of the pistons 55.

Referring again primarily to FIGS. 4 and 5, the compressed charge is delivered from the crankcase chambers 62 into an area above the pistons 55 through a plurality of circumferentially spaced scavenge ports 69.

Each of a pair of cylinder heads 71 and 72 are affixed to the cylinder blocks 49 and 51 respectively. Each cylinder head 71 and 72 has a pair of recesses 73 formed in its lower surface which cooperates with the heads of the pistons 55 and the cylinder bores 54 to define the combustion chambers for the engine 16. Spark plugs 74 are mounted in the cylinder heads 71 and 72 and are fired by pairs of magneto generators 75 each driven from a respective outer end of the crankshafts 57 and respectively. As has been noted, the cylinders of each cylinder block 49 and 51 fire at 180 degree intervals from each other while the cylinders of one cylinder block 49 fire at 90 degrees from the cylinders of the other cylinder block 51.

Exhaust ports 76 open through the forward side of the cylinder blocks 49 and 51. The exhaust ports 76 of the cylinder block 49 communicate with an exhaust system of the type described in more detail in the co-pending application entitled "Exhaust System For Snowmobile", Ser. No. 07/820,327, filed on the same day as the parent of this application and assigned to the Assignee hereof. The disclosure of that application is incorporated herein by reference. Briefly, the exhaust system comprises a first paired exhaust manifold 77 having two inlets and a common outlet. Because the cylinders of this cylinder block fire at 180 degrees from each other, the firing pulses in the paired manifold 77 will not cause any adverse effects since the exhaust pulses from one exhaust port 76 will not reflect back to the other at any time when it is open to any significant amount. In a similar manner, the exhaust ports 76 of the cylinder block 51 also communicate with a paired manifold 78 and again since these cylinders fire at 180 degrees from each other the pairing of the exhaust ports will have no adverse effects.

A pair of exhaust pipes 79 and 81 extend from the manifolds 77 and 78, respectively and terminate at separate inlets to a common expansion chamber, silencer 82 positioned at one side of the snowmobile 11 and at one end of the engine 16. Again, because of the fact that the cylinders fire at 90 degrees from each other, their common communication with a single silencing device 82 will not provide any adverse effect of exhaust gas pulses traveling back through the exhaust system to the individual exhaust ports 76. The exhaust silencer 82 has a common atmospheric exhaust outlet.

As has been noted, the engine 16 is liquid cooled and to this end the cylinder blocks 49 and 51 are provided with cooling jackets 83. In a like manner, the cylinder heads 71 and 72 are provided with their respective cooling jackets 84. The cylinder block cooling jackets 83 communicate with the cylinder head cooling jackets 84 through suitable passages.

Figure 3:
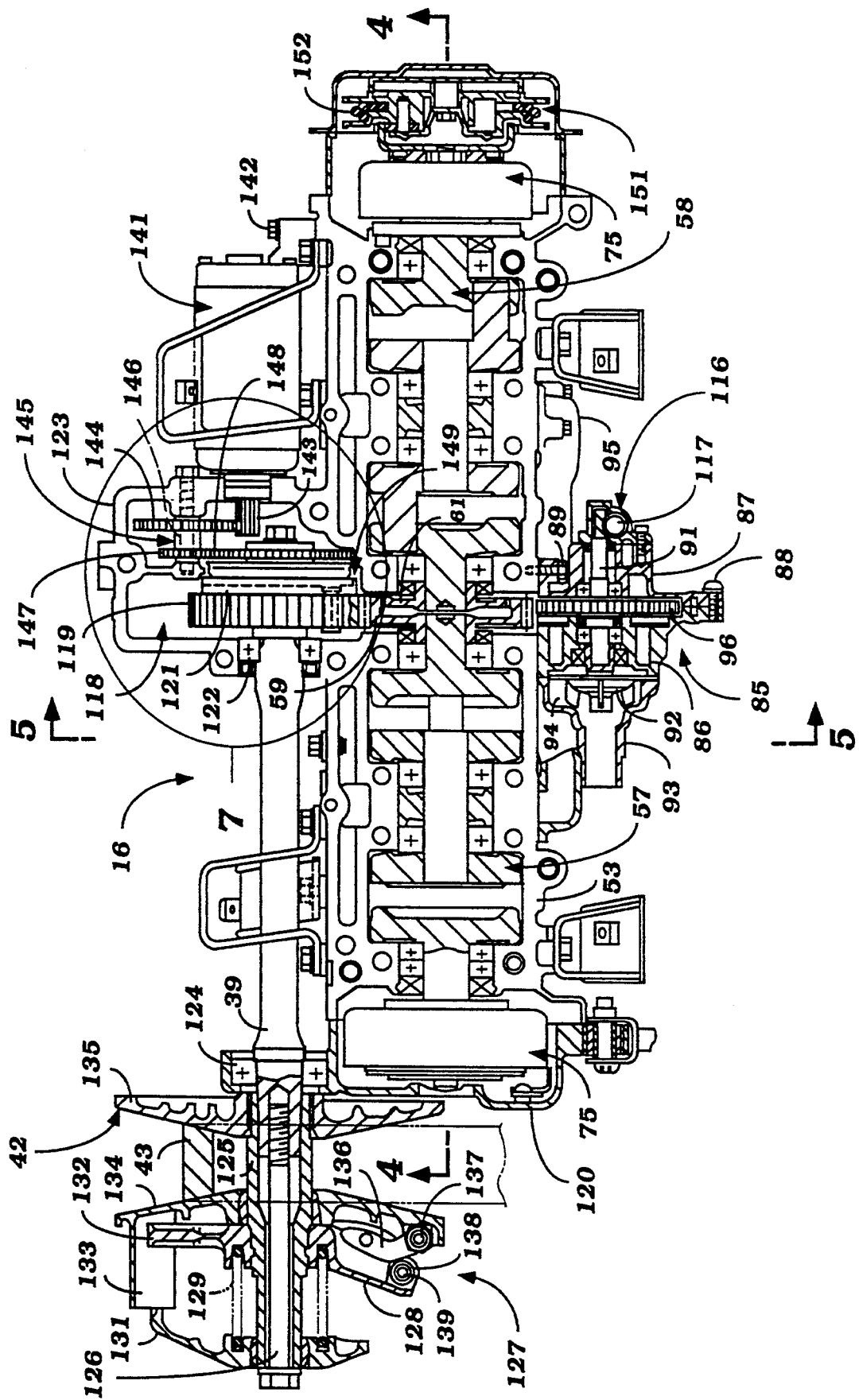
FIG. 3 is a cross sectional view taken along a horizontal plane passing through the crankshaft of the powering internal combustion engine and shows a portion of the drive arrangement.
Figure 4:
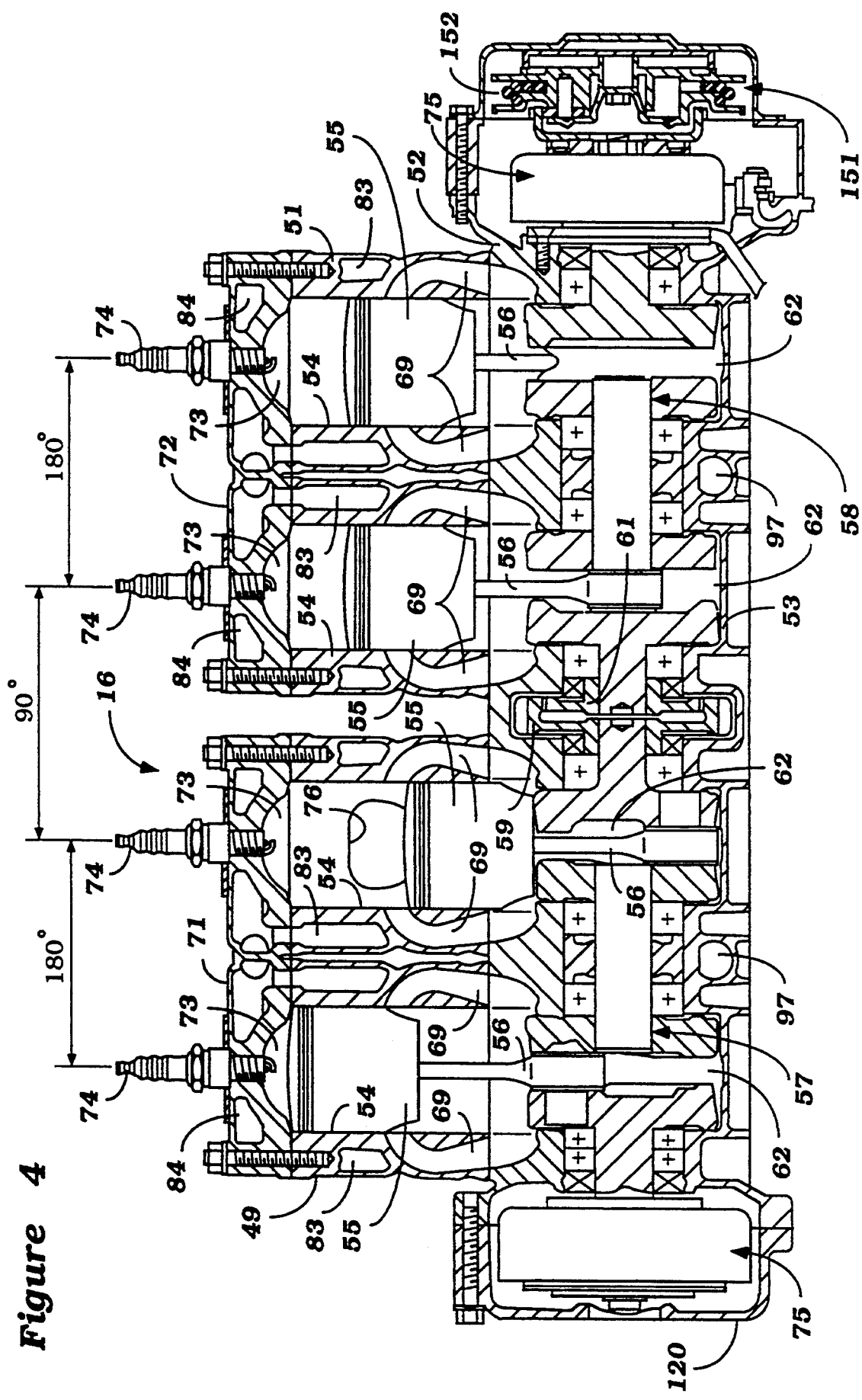
FIG. 4 is a cross sectional view taken along the line 4—4 of FIG. 3.
Figure 5:
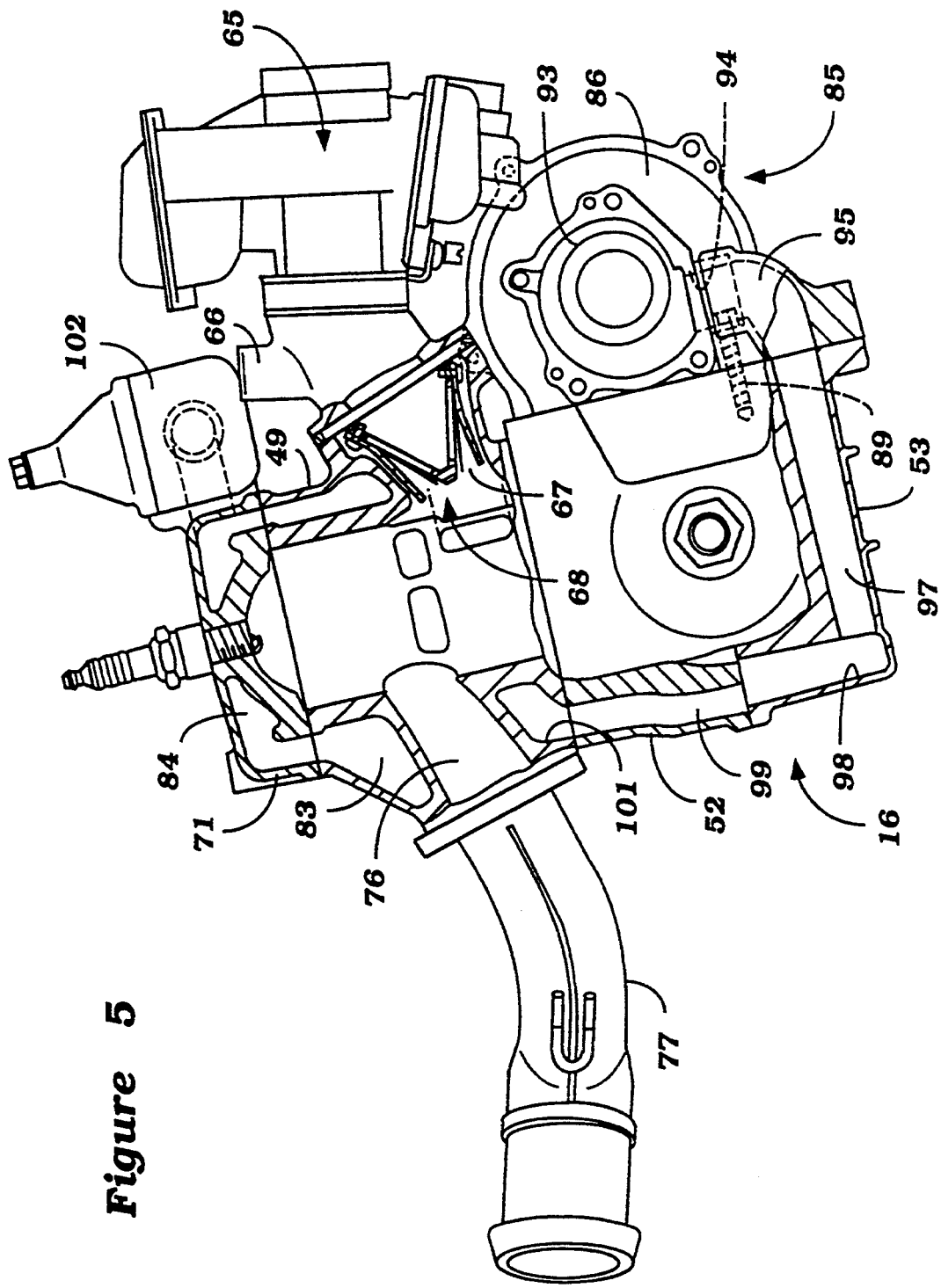
FIG. 5 is a cross sectional view taken along the line 5—5 of FIG. 3.

The engine 16 is provided with a common cooling pump, indicated generally by the reference numeral 85 which is positioned on the rear or intake side of the engine 16 and the construction and operation of which may be best understood by reference to FIGS. 3 through 5. The coolant pump 85 includes a housing assembly made up of a pair of housing pieces 86 and 87 that are connected to each other by means of a plurality of threaded fasteners 88. This housing assembly is then fixed to the cylinder blocks 49 and 51 by further threaded fasteners 89. A coolant pump shaft 91 is journaled within this housing assembly and has affixed to one of its ends an impeller 92. The impeller 92 draws water through an inlet 93 formed in the housing from a heat exchanger, radiator system, to be described, and discharges the water through an outlet 94 into a water manifold 95.

The water pump drive shaft 91 has affixed to it a drive gear 96 which is meshed with the gear 59 driven by the crankshafts 57 and 58.

As may be best seen in FIGS. 4 and 5, the water manifold 95 communicates with a pair of water passages 97 which are formed in the crankcase lower members 53 and which pass between adjacent crankcase chambers 62. These passages 97 intersect vertically extending passages 98 formed on the exhaust side of the engine which, in turn, communicate with passages 99 formed in the upper crankcase member 52. The passages 99, in turn, communicate with inlet openings 101 formed in the respective cylinder block cooling jackets 83 at the forward or exhaust side thereof. Hence, the cool coolant delivered by the water pump assembly 85 will first flow around the crankcase chamber 62 and insure adequate cooling of them when the engine is at its operating temperature to improve volumetric efficiency. Also, when the engine is warming, these passages will provide initial preheating for the crankcase chambers 62 so as to insure good fuel vaporization.

A thermostat assembly 102 is positioned on the intake side of the cylinder head cooling jackets 84 and circulates the coolant back to the heat exchanger system which will now be described by particular reference to FIGS. 1 and 2.

This heat exchanger system is of the type described in more detail in the co-pending application "Wind Leading System For Snowmobile", Ser. No. 07/820,324, filed concurrently with the parent of this application and assigned to the Assignee of this application, the disclosure of which is incorporated herein by reference. Basically this heat exchanger system includes a cross flow radiator 103 that is disposed generally above the engine and specifically above the exhaust manifolds 77 and 78. A conduit 104 communicates the thermostat 102 with the left hand side of the cross flow radiator 103. Coolant is then delivered from the other side of the cross flow radiator 103 to a conduit 105 that extends along the right side of the snowmobile and which then curves inwardly to communicate with a longitudinally extending heat exchanger 106 that extends along one side of the underside of the seat 18. The seat 18 is constructed and configured so that air can flow across the heat exchanger 106 for its cooling but some heat will also be transferred to the seat 18 so as to warm the riders.

At the rear end of the seat 18, the heat exchanger 106 communicates with a conduit 107 that supplies coolant to a further transversely extending heat exchanger 108. The heat exchanger 108 then communicates with a conduit 109 which delivers the coolant to a further longitudinally extending heat exchanger 111 which extends parallel to the heat exchanger 106 on the other side of the seat 18. The heat exchanger 111 communicates at its forward end with a conduit 112 that delivers the coolant to the coolant pump inlet 93.

The upper cowling piece 14 is provided with a pair of nostril like air inlet openings 113 which receive ram air flowing in the direction of the arrows in FIGS. 1 and 2 and direct this air to the radiator 103. The air then can exist through a pair of rearwardly positioned ducts 114 formed on opposite sides of the cowling piece 21 so that the heated air flow will be directed away from the handlebar assembly 19. It is desirable to insure that this air flow does not pass across the hands of the rider because of the moisture in the air which could chill the rider's hands and body. Therefore, the air flow is clearly directed away from the rider and the rider's comfort is maximized.

The cooling system is also provided with an expansion tank 115 that accommodates for changes in volume of the coolant due to changes in its temperature.

Figure 6:
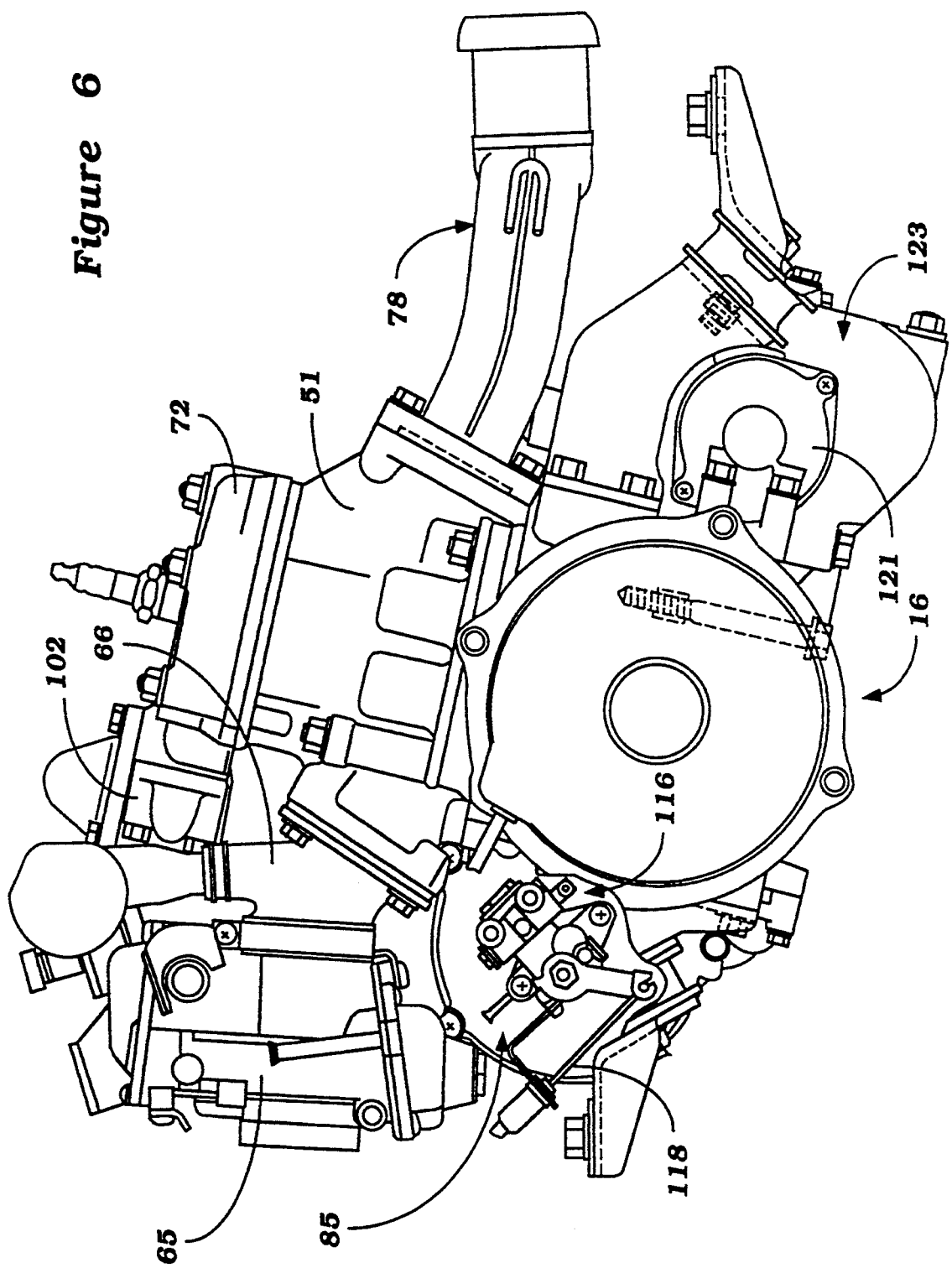
FIG. 6 is a end elevational view looking in the direction opposite to FIG. 5 of the powering engine.

A governor system, indicated generally by the reference numeral 116, (FIGS. 3 and 6, is also driven off of the water pump shaft 91 by means of a worm gear 117 for controlling the speed of the engine. A bowden wire throttle cable 118 is connected to this governor mechanism 106 for engine speed control, in a well known manner.

Referring now to FIG. 3, the drive for the drive shaft 39 will now be described. It should be noted that the crankcase assembly comprised of the upper member 52 and lower member 53 defines a gear case chamber 118 on the forward or exhaust side of the engine. A gear 119 is contained within this gear case chamber 118 and is enmeshed with the gear 59 driven by the crankshafts 57 and 58. The gear 119 is connected to a drum 121 which is, in turn, splined to one end of the belt drive shaft 39 for driving it. It should be noted that the shaft 39 is journaled in a bearing 122 formed at the center of the crankcase chamber and within a casing portion 123 which defines the gear case chamber 118.

The shaft 39 extends transversely to the engine on the forward side thereof and is journaled adjacent the magneto generator 75 by means of a bearing 124 carried by a cover plate 120 which encloses the magneto generator 75.

A drive sleeve 125 of the variable pulley 42 is affixed for rotation with the drive shaft 39 by means of a pilot bolt 126. A centrifugal clutch 127 interconnects the drive sleeve 125 with the variable pulley 42. The centrifugal clutch assembly 127 includes a pressure plate 128 which is engaged by a coil compression spring 129 that is loaded by a supporting plate 131. The pressure plate 128 has a lug portion 132 that is received within a longitudinal slot 133 formed by a axially moveable sheave portion 134 of the variable pulley 42. A fixed pulley sheave portion 135 opposes the portion 134 and the drive belt 43 is received there between.

A centrifugal weight 136 is journaled on the moveable pulley portion 134 by a cross shaft 137 and swings into engagement with a roller 138 carried on a shaft 139 of the pressure plate 128.

When the engine 16 is operating at low speed, there will be no/or little pivotal movement of the centrifugal weight 136 and the pulley sheave portions 134 and 135 will be spaced so that although they rotate they will not drive the belt 43. However, as the speed increases, the centrifugal weight 136 will pivot and cam the moveable sheave 134 toward the fixed sheave 135 to first establish a driving connection. As the speed continues to increase, the effective diameter of the pulley 42 will increase and the speed ratio between the driving pulley 42 and the driven pulley 44 will decrease so as to provide a gradually increasing variable transmission ratio as is well known in this art.

An electrical starter motor, indicated generally by the reference numeral 141 (FIGS. 3 and 6) is mounted on the portion of the crankcase assembly associated with the cylinder block 51 by mounting bolts 142. The starter motor 141 has an output shaft that drives a starter gear 143 that is enmeshed with a further gear 144 formed by a compound gear assembly 145 that is journaled on a shaft 146 in the transmission casing 123. A further gear 147 of the compound gear 145 meshes with a gear 148 that is coupled to the drive shaft 39 through a one way clutch, indicated generally by the reference numeral 149 so that starting of the engine is possible when the starter motor 141 is energized. Once the engine starts, however, the one way clutch 149 will let the engine crankshafts 57 and 58 rotate at a higher speed even if the starter motor 141 is not fully shut off.

For emergency starting, a pull type starter 151 is provided adjacent the magneto generator 75 associated with the cylinder block 51 and includes a rope 152 for pull starting.

The snowmobile 11 is also provided with a fuel tank 150 that is positioned beneath the body portion 17 and which has a fill neck 153 that can be accessed through a fill opening 154. The fuel tank 152 supplies fuel to the carburetors 65 in a known manner.

It should be readily apparent that the disclosed driving arrangement provides an extremely compact power unit for driving the belt of a snowmobile even though a multiple cylinder engine is employed. In addition, the engine output shaft does not directly drive the transmission for the drive belt and hence is not subjected to side loads. Furthermore, by driving the drive belt drive shaft from a point between the ends of the engine output shaft, torsional loading on the engine output shaft is reduced and a more robust belt drive shaft journal may be employed.

Figure 7:
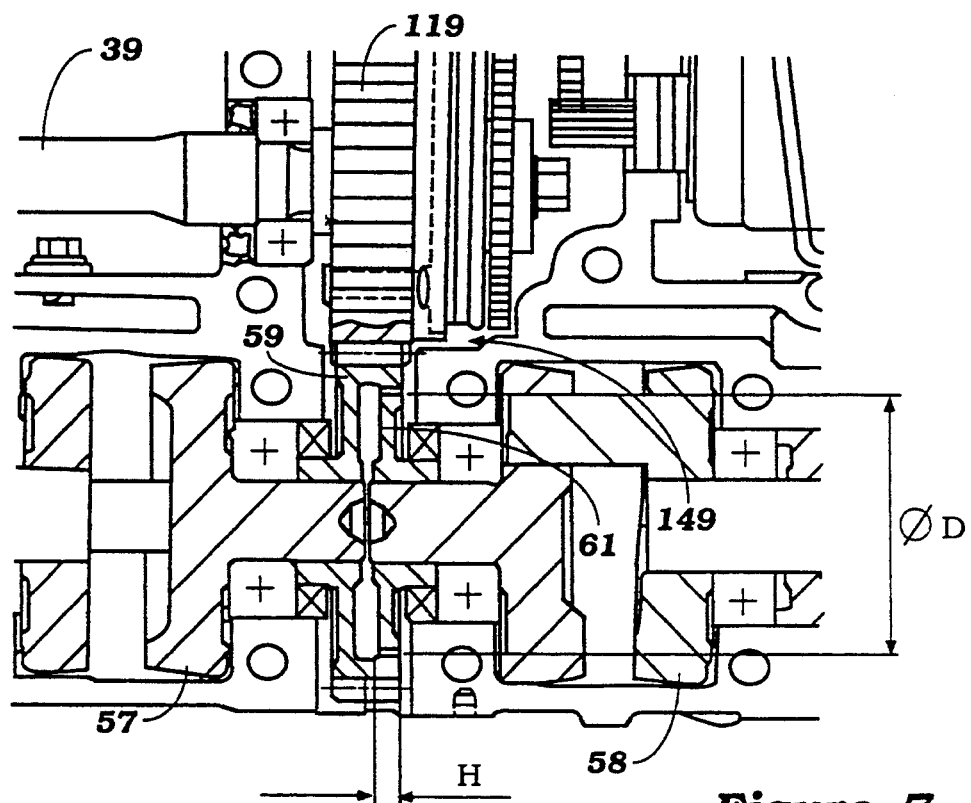
FIG. 7 is an enlarged cross sectional view of the area encompassed by the circle 7 in FIG. 3.
Figure 8:
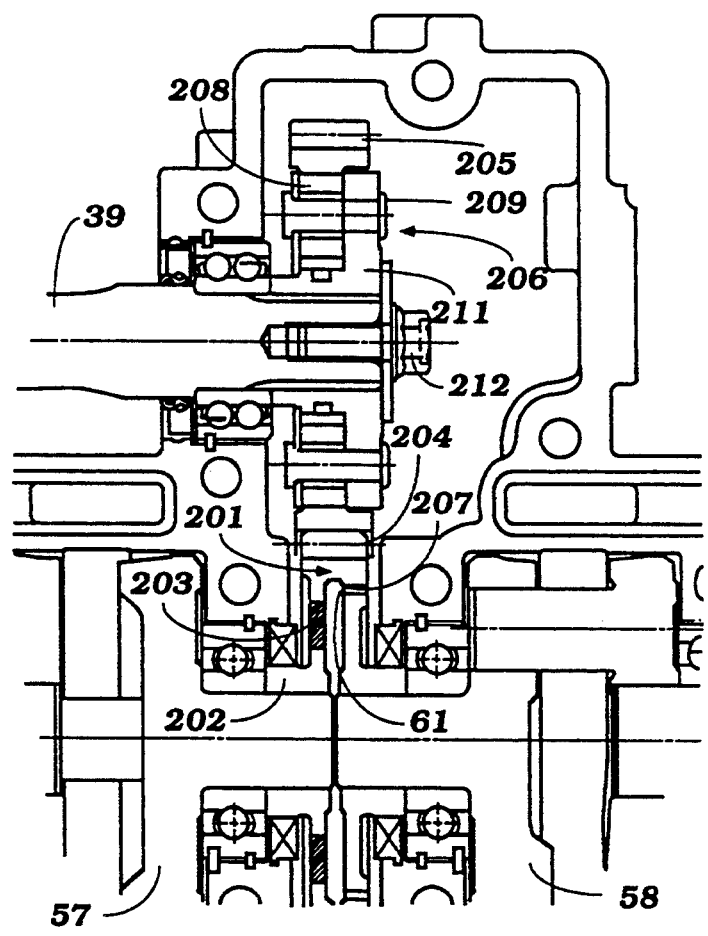
FIG. 8 is an enlarged view, in part similar to FIG. 7, and shows another embodiment of the invention.

In the embodiment of FIG. 7 and has been noted, the splined connection 59 and 61 between the engine outputs shafts 57 and 58 has accommodated angular misalignment while, at the same time, being capable of transmitting large power. FIG. 8 shows another embodiment of the invention which is generally similar to the embodiment of FIG. 7 but which further improves the driving arrangement and accommodates flexibility.

In this embodiment, a first internally splined member, indicated generally by the reference numeral 201, has hub portion 202 that is affixed to the end of the crankshaft 57. An elastic coupling 203 interconnects the hub portion to an outer ring 204 that is integrally formed with a gear which meshes with a gear 205 which is coupled, by a flexible coupling, indicated generally by the reference numeral 206 to the belt drive shaft 39. The construction of the coupling 206 will be described later.

The outer ring 204 has internal splines 207 which are meshed with the external splines of the member 61, which has the construction as in the previously described embodiment. As a result of this, additional accommodation for angular misalignment between the shafts 57 and 58 can be accommodated.

The flexible coupling 206 includes a plurality of elastic members 208 that are pressed into suitable openings in the gear 205 and which are received on pins 209 that are affixed to a hub member 211 which is affixed to the belt drive shaft 39 by means of a fastener 212 and splined connection. As a result, there is also the accommodation of some flexibility in the drive to the belt drive shaft 39 so as to afford greater damping while not reducing the ability to transmit high loads.

The splined connection 61–207 of FIG. 8 has the same dimensional relationships as the embodiment of FIG. 7. That is, the length "H" of the splined connection is substantially less than the diameter "D".

In the embodiment of FIG. 8, the elastic coupling 203 is provided in the crankshaft 57 while the splined connection is provided in the crankshaft 58. Obviously, this construction can be reversed.

Figure 9:
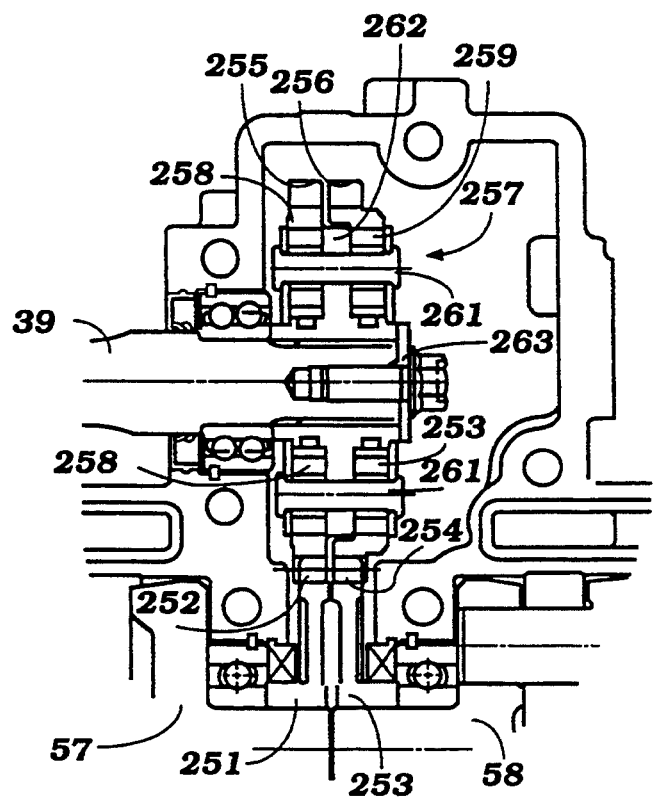
FIG. 9 is an enlarged view, in part similar to FIGS. 7 and 8, and shows yet a further embodiment of the invention.

In all of the embodiments as thus far described a splined connection has been employed so as to assist in accommodating angular misalignment while, at the same time, transmitting high loads. FIG. 9 shows another embodiment of the invention wherein no splined connection at all is employed but the angular accommodation is achieved through a flexible coupling.

Referring specifically to this embodiment, a first drive member 251 having external teeth 252 is affixed for rotation with the crankshaft 57. A second drive element 253 having external teeth 254 is affixed to the crankshaft 58.

The teeth 252 and 254 of the drive elements 251 and 253 are respectively engaged with gears 255 and 256 which are affixed to the belt drive shaft 39 by means of a flexible coupling, indicated generally by the reference numeral 257. This flexible coupling 257 includes a plurality of elastomeric sleeves 258 that are received in bores formed in the gear 255. In a like manner, elastic sleeves 259 are received in bores in the gear 256. A plurality of pins 261 pass through the sleeves 258 and 259 and are carried by a member 262 that has splined connection to the belt drive shaft 39. A fastener assembly 263 affixes the member 262 for rotation with the belt drive shaft 39. The elastic coupling 257 will accommodate angular misalignment between the engine crankshafts 57 and 58 but will have the capability of transferring forces therebetween.

Rather than providing the elastic coupling 257 between the driven gears 255 and 256 and the belt drive shaft 39, similar elastic couplings may be provided in either or both of the drive elements 251 and 253 between hub portions and their external teeth 252 and 254, such as the coupling 203 in the embodiment of FIG. 8.

Of course, the foregoing is a description of preferred embodiments of the invention and various changes and modifications may be made without departing from the invention. For example, although the invention describes a power plant having a reciprocating engine, the invention also can be employed with engines of the rotary type and wherein the output from the engine output shaft is taken between adjacent rotary devices that are driven by the internal combustion of the engine. Various other changes and modifications may be made without departing from the spirit and scope of the invention, as defined by the appended claims.

I claim:

1. A driving arrangement for driving a shaft from a pair of engine output shafts rotatable about concentric axes comprising a first element fixed to an end of one of said engine output shafts for rotation therewith, a second element affixed to an adjacent end of the other of said engine output shafts for rotation therewith, and means including a splined connection for driving said shaft from said elements and interconnecting said elements for simultaneous rotation, said splined connection including interengaging internally and externally splined cylindrical components, the splines of said cylindrical components lying on a diameter that is substantially greater than the length of the splines for accommodating axial flexure while maintaining circumferential rigidity.

2. A driving arrangement as set forth in claim 1 wherein the splined connection interconnects the first and second elements for simultaneous rotation.

3. A driving arrangement as set forth in claim 2 wherein the splined connection comprises a male spline formed integrally on one of the elements and a female spline formed integrally on the other of the elements.

4. A driving arrangement as set forth in claim 3 wherein the female splined element has a driving connection to the shaft.

5. A driving arrangement as set forth in claim 4 wherein the female splined element has an external gear that drives the shaft.

6. A driving arrangement as set forth in claim 4 further including an elastic connection in the drive connection between the female splined element and the shaft.

7. A driving arrangement as set forth in claim 4 further including an elastic connection interposed in the connection of one of the splined elements to the respective engine output shaft.

8. A driving arrangement as set forth in claim 1 for driving a snowmobile having a body, a drive belt positioned beneath said body and supported by said body for propelling said snowmobile, an engine compartment formed by said body, said engine output shafts comprising portions of an internal combustion engine mounted by said body in said engine compartment with said output shafts rotatable about a common axis disposed transversely to the longitudinal axis of said snowmobile, the shaft comprising a belt drive shaft supported for rotation about an axis parallel to the axis of said engine output shafts, and means for driving said drive belt from said belt drive shaft.

9. A driving arrangement as set forth in claim 8 wherein the belt drive shaft is journaled by the engine.

10. A driving arrangement as set forth in claim 9 wherein the belt drive shaft is journaled by the same portion of the engine that journals the engine output shafts.

11. A driving arrangement as set forth in claim 10 wherein the belt drive shaft is journaled adjacent the point where it is driven from the engine output shafts and adjacent the point where it drives the drive belt.

* * * * *